United States Patent [19]

Lewis, Jr.

[11] Patent Number: 4,619,485
[45] Date of Patent: Oct. 28, 1986

[54] METHOD OF MANUFACTURING FUSED BRUSHES

[75] Inventor: John C. Lewis, Jr., Forest Dale, Vt.

[73] Assignee: Tucel Industries, Inc., Forest Dale, Vt.

[21] Appl. No.: 709,667

[22] Filed: Mar. 8, 1985

[51] Int. Cl.⁴ .............................................. A46D 3/04
[52] U.S. Cl. ....................................... 300/21; 264/243
[58] Field of Search ...................................... 300/2–11, 300/21; 264/243, 297.2, 297.3, 297.8; 425/805, 588

[56] References Cited

U.S. PATENT DOCUMENTS

| | | | |
|---|---|---|---|
| 2,520,263 | 8/1950 | Vinal | 425/805 X |
| 2,923,035 | 2/1960 | Schwartz | 264/243 X |
| 3,357,058 | 12/1967 | Kutik | 425/588 |
| 4,233,260 | 11/1980 | d'Argembeau | 300/21 X |
| 4,348,060 | 9/1982 | Lewis, Jr. | 300/21 |

FOREIGN PATENT DOCUMENTS 161134 12/1981 Japan .................................. 425/588
161131 12/1981 Japan .................................. 425/588

Primary Examiner—Mark Rosenbaum
Attorney, Agent, or Firm—Lowe, Price, LeBlanc, Becker & Shur

[57] ABSTRACT

A method for manufacturing synthetic brushes comprising synthetic filament fused directly to a synthetic polymer substrate is disclosed. A plurality of brush backs are formed integrally on a frame. The brush backs are then held stationary while a picking plate having a plurality of pickers, in a design of brushes, is indexed into a stock box and filled with tufts of synthetic filaments. The picking plate is then indexed out of the stock box and into a heated plate to fuse the ends of each tuft. The picking plate with tufts is then indexed into the frame-holding means whereby each of the fused ends is simultaneously mounted on each of the brush backs. In this way, a plurality of brushes are simultaneously formed. The brushes may then be packaged on the frame or individual gates severed to permit packaging of individual brushes.

6 Claims, 15 Drawing Figures

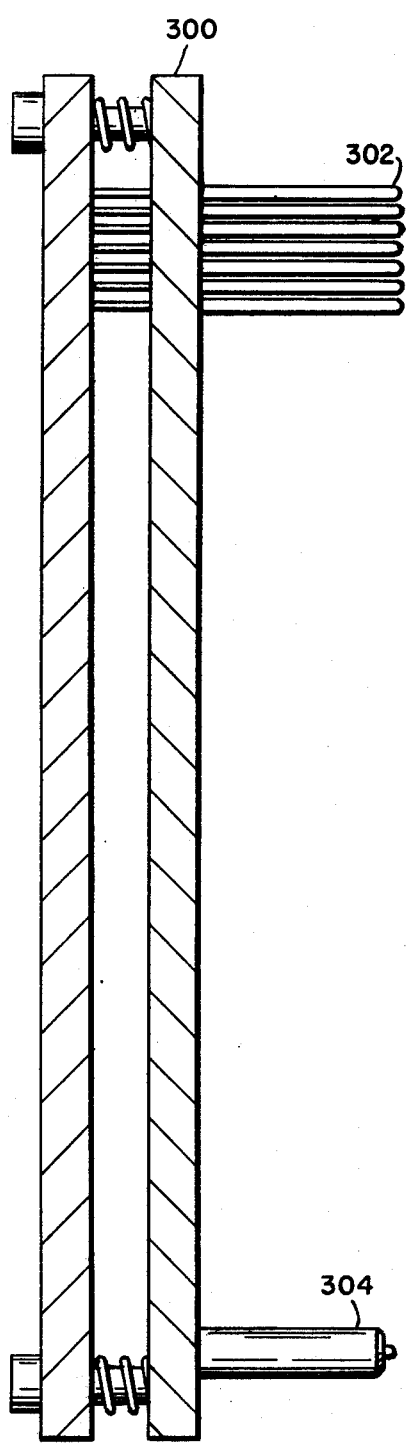
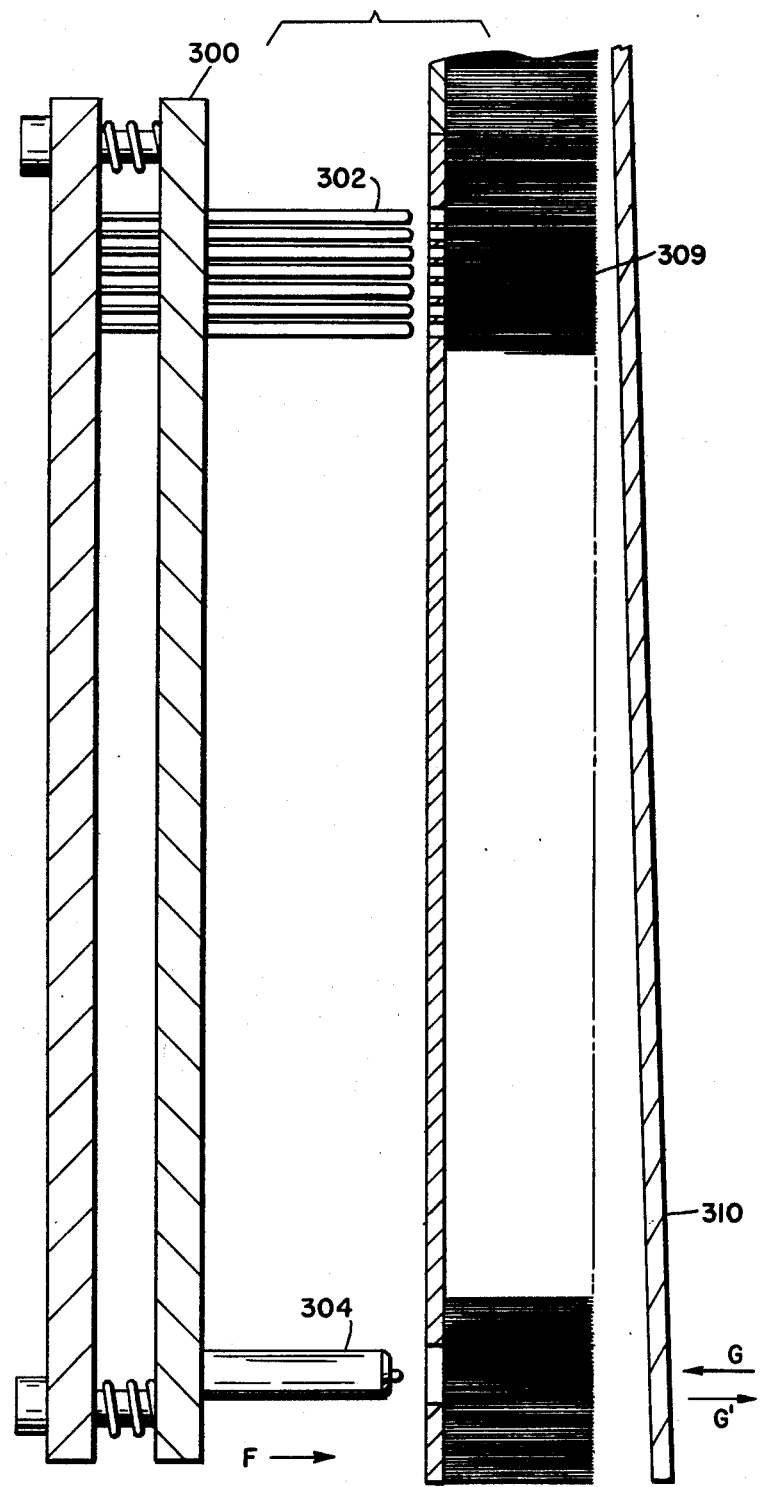
Fig.10
Fig.11

METHOD OF MANUFACTURING FUSED BRUSHES

This invention relates to a method for tufting, simultaneously, multiple synthetic brushes.

Prior to the invention of fused brush tufts, brooms and brushes used for sweeping or cleaning were manufactured by inserting one tuft at a time into a preformed slot or hole in a brush block. Brooms or brushes were constructed of natural fibers, animal hair, or synthetic filament. Tufts thereof were normally first formed and then inserted into a slot or hole in a substrate such as a brush block. After being inserted therein, the tuft would be fastened with, for example, a staple, a wire, or glue. As noted, this method of manufacture was time consuming in that it was limited to tufting a brush block one tuft at a time.

In my prior patents, for example, U.S. Pat. Nos. 3,471,202; 3,596,999; 3,604,043; 4,189,189; 4,291,431 and 4,348,060, there is described a method and apparatus for fusing multiple tufts of synthetic filament simultaneously and forming therewith brush and broom constructions. This method permitted the simultaneous manufacture of a brush of multiple fused synthetic filament tufts and thereby rendered obsolete the prior methods of brush construction which included tufting one tuft at a time. These inventions allowed the manufacture of completely synthetic brushes and brooms in a much shorter time. However, these inventions were directed to forming brush or broom units one at a time. Each brush or broom unit then in a single operation was tufted with multiple tufts of fused synthetic filaments, and even though all tufts on a single unit were fused and mounted simultaneously, each unit was handled separately.

It has become increasingly important to establish high volume manufacturing methods in order to reduce handling, labor costs and production time. Therefore, methods whereby more than one complete brush construction can be simultaneously fused, trimmed and handled in a single operation is important.

The instant invention provides a novel method whereby a plurality of brush block substrates may be tufted with fused tufts simultaneously. The brush block substrates are premolded in a single integral frame unit and said frame is then inserted in a block-holding device. All blocks then in a frame are tufted with fused tufts in a single step whereby said plurality of brushes may be formed in a short period of time, such as five to six seconds. Subsequently, the finished brushes are separated from the frame. Accordingly, it is an object of this invention to provide a method for fusing tufts on a plurality of brush constructions in a single step.

It is another object of this invention to provide a novel method for tufting, trimming, and handling large volume production whereby very small brush constructions may be simultaneously formed into complete brush units.

It is yet another object of this invention to provide a novel method for the manufacture of synthetic fused toothbrushes whereby a plurality of toothbrushes are simultaneously tufted and subsequently separated from an integral frame-holding means.

These and other objects of the instant invention will become readily apparent with reference to the drawings and following description wherein:

FIG. 10 is a side view in partial section of the tuft-forming picker of FIG. 9 taken along Line 10—10 of FIG. 9;

FIG. 11 is a side view in partial section of the tuft-forming picker of FIG. 9 prior to indexing into a filament stock box;

Figure 1:
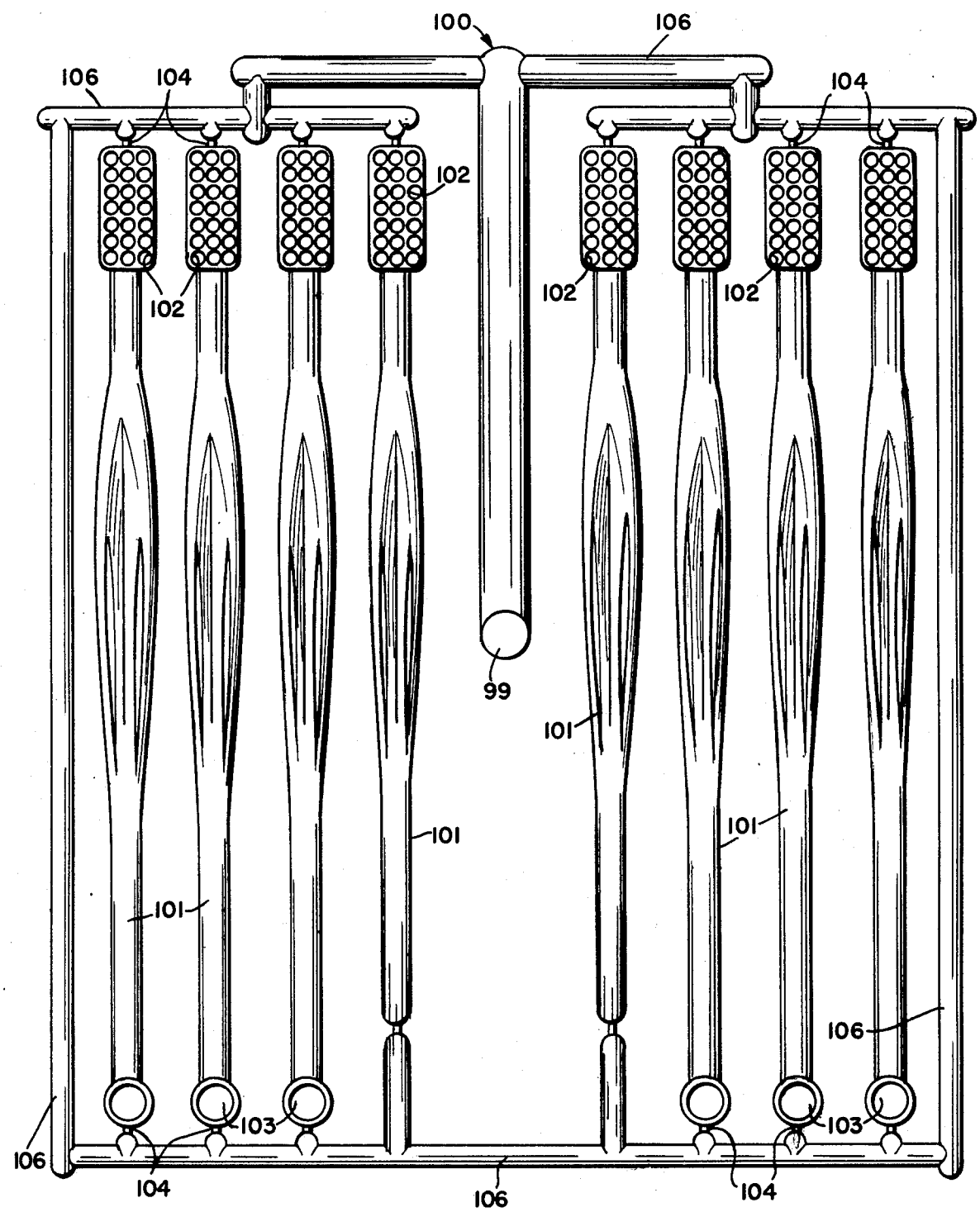
FIG. 1 is a front view of a frame of this invention containing eight toothbrush blocks.

With reference to the drawings and to FIG. 1 in particular, the molded toothbrush handle frame 100 of this invention is shown therein with eight toothbrush handles 101 integrally molded to frame 100 by means of gates 104 and connecting runners 106. The handles 101 have premolded tufting acceptance sections 102 and 103 at either end thereof. The frame 100 was molded by injection molding employing a hot runner system whereby the molten polypropylene resin was injected into the mold through a point 99 and was allowed to create the frame/handle section. During ejection, the whole frame 100 including the molded toothbrush handles 101 was integrally connected to runners 106 across gates 104 in order to use the entire frame during fusing.

Figure 2:
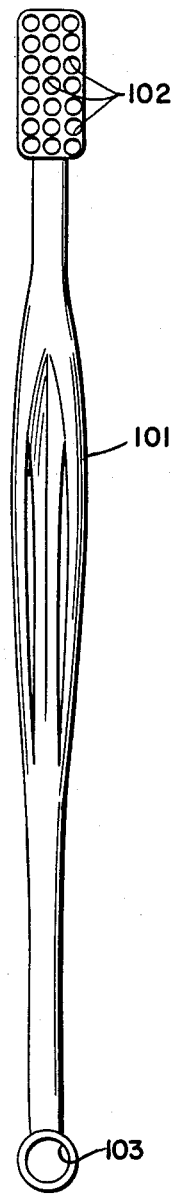
FIG. 2 is a front view of a single toothbrush block as removed from the frame construction of FIG. 1.

The toothbrush handle 101 of this invention is fused at each end in a single step. With reference to FIG. 2, the handle has two fusing sections 102 and 103. Section 102 is designed to accept 21 filament tufts while the opposite section 103 is designed to accept a single hollow fused circular tuft simultaneously.

Thus, by fusing one frame containing eight toothbrush handles every ten seconds, it is possible to tuft approximately 2,640 toothbrushes per hour. The fastest known stapling brush machines can only tuft up to about 800 toothbrushes per hour. In terms of labor costs, this new tufting method, by employing the frame 100, can lower tufting costs by 70% and increase productivity by 70%.

Figure 3:
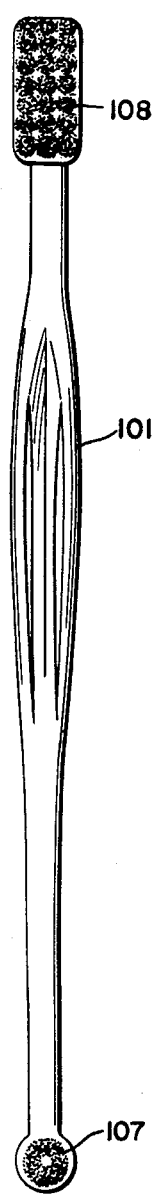
FIG. 3 is a side view of a tufted toothbrush as removed from the frame construction of FIG. 1.
Figure 4:
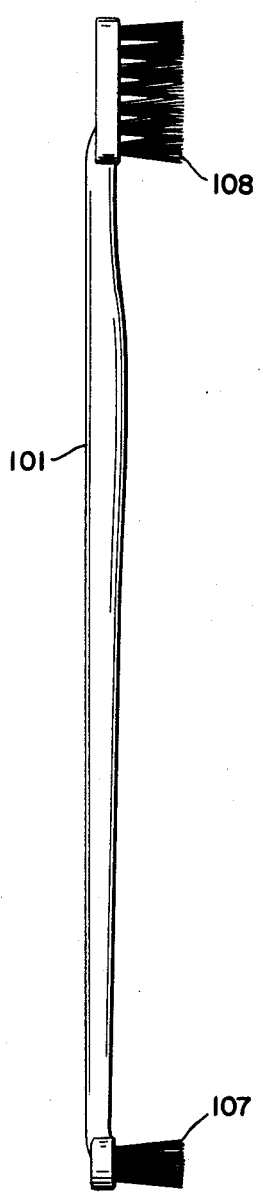
FIG. 4 is a top view of a tufted toothbrush of FIG. 3.
Figure 5:
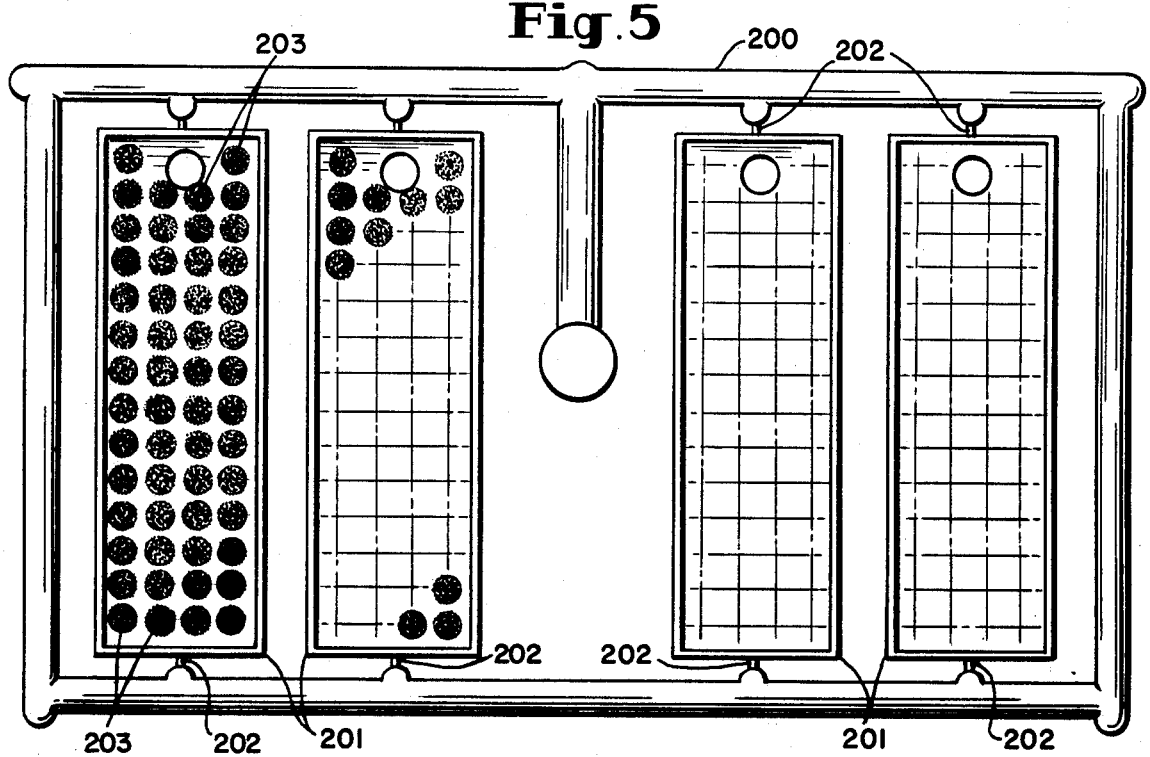
FIG. 5 is a front view of a frame containing two nail brush blocks.
Figure 6:
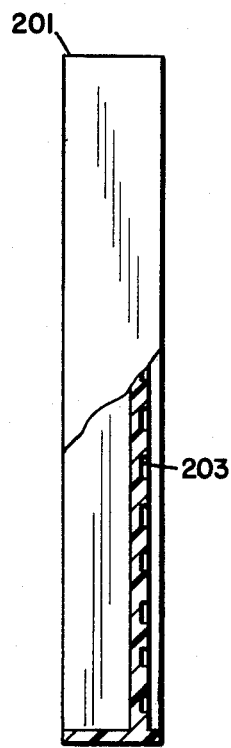
FIG. 6 is a side view in partial section of a brush block as removed from the frame of FIG. 5.
Figure 7:
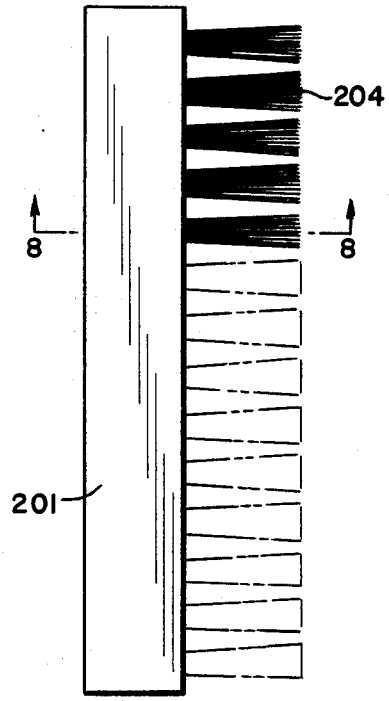
FIG. 7 is a side view of a tufted nail brush as removed from the frame construction of FIG. 5.
Figure 8:
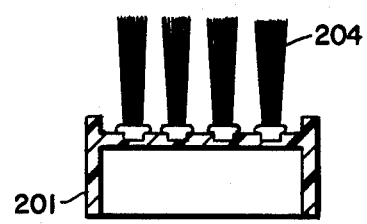
FIG. 8 is a cross-sectional view taken along Line 8—8 of FIG. 7.

After toothbrushes 101 have been tufted, they are removed from the frame by cutting across the molded gates 104 to yield a brush as illustrated in FIGS. 3 and 4.

Figure 15:
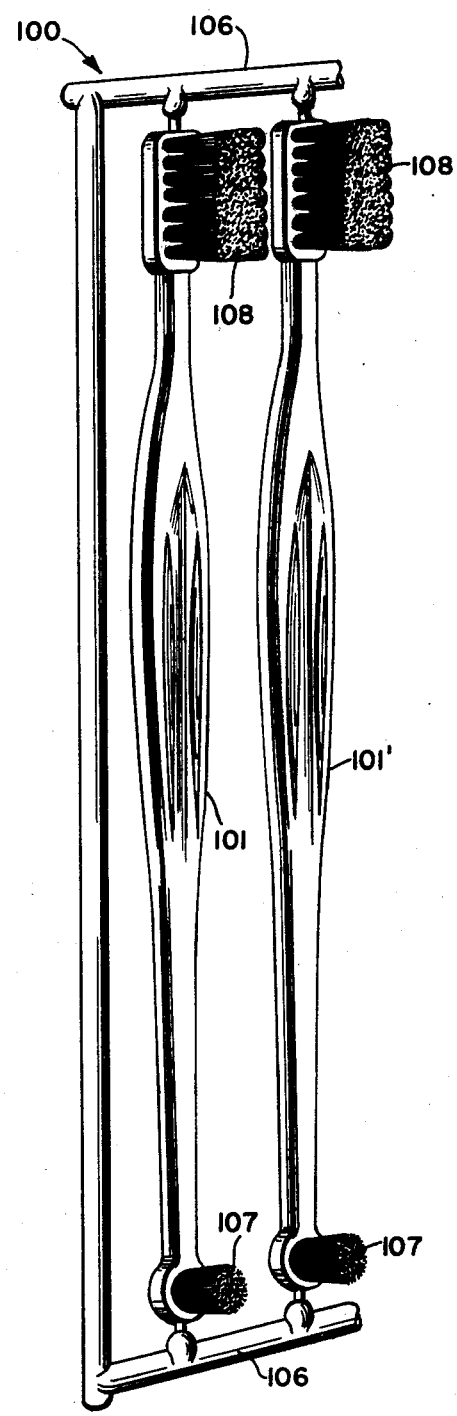
FIG. 15 is a perspective view of the tufted toothbrush frame of FIG. 1.

It is also possible, as would be obvious to those skilled in the art, to mold the frame in such a manner that the frame may act as a package of the tufted brushes after fusing with the customer separating the individual brush from the frame. FIG. 15 illustrates this concept of marketing toothbrushes 101 having tufts 107 and 108 in a multiple toothbrush frame 100 interconnected by runners 106.

With attention to FIG. 5-8, a frame 200 may also be utilized to mount integral brush blocks 201 with gates 202. The overall frame then, as described above with reference to toothbrushes, may be used to form nail scrub brushes or the like. Each brush back 201 has, for example, 44 tuft-receiving apertures 203. After the tufting process is complete, a nail scrub brush 201' will be formed with fused tufts 204 mounted thereon.

It is possible then to form up to 1,320 nail scrub brushes per hour, each containing 44 individual filament tufts. The fastest stapling known can only tuft approximately 660 units.

Figure 9:
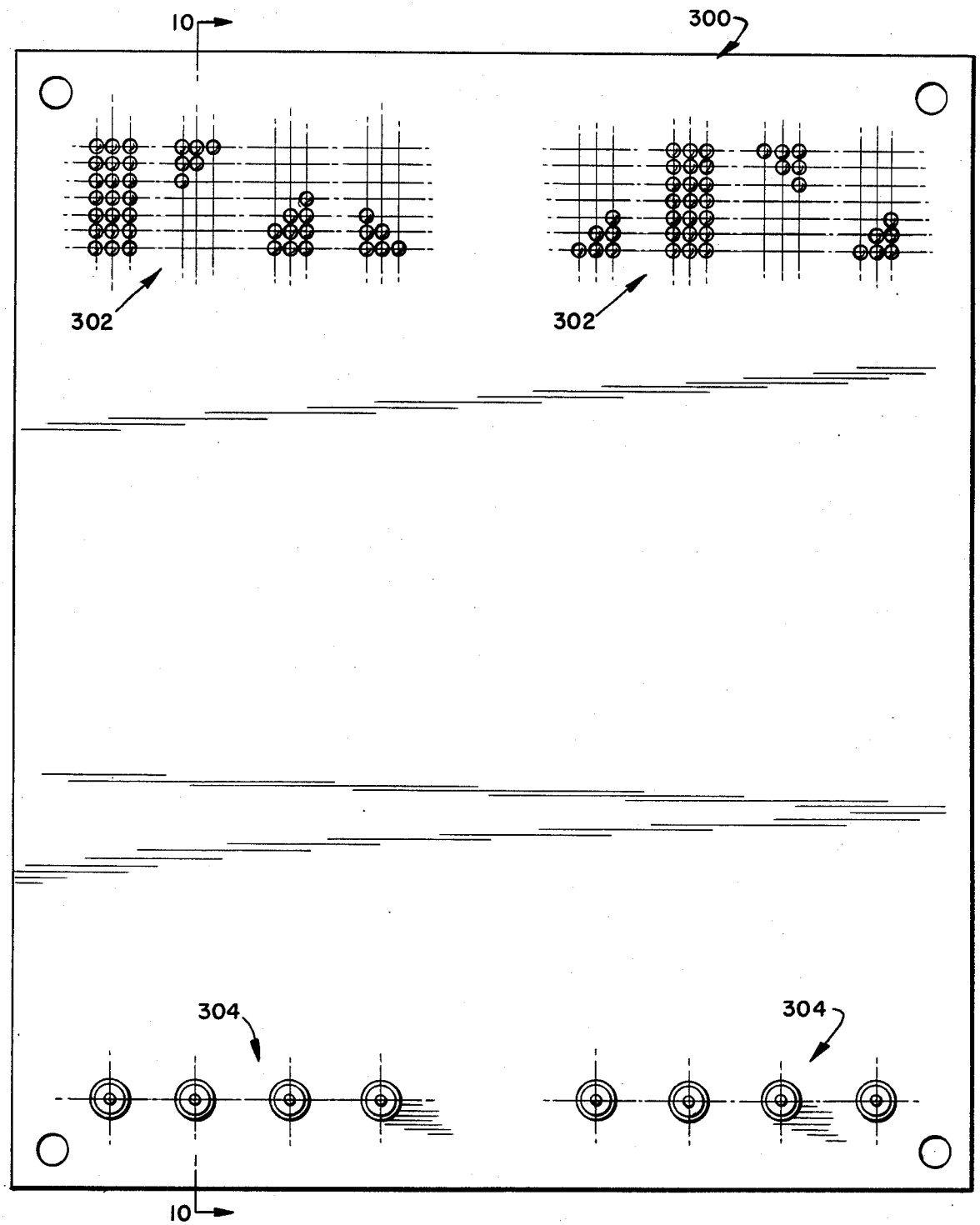
FIG. 9 is a front view of a tuft-forming picker of this invention.

With reference to FIGS. 10-14, the process for fusing tufts to be mounted on the individual, integral brush backs formed within the frame of this invention is similar to that disclosed in my above-identified patents, the disclosures of which are hereby incorporated by reference. A tuft-forming picker 300 is illustrated in FIG. 9. Such a picker typically uses cut-to-length filament. It is possible, however, to employ other methods using, for example, continuous filament tow directed to a picking device from a reel of filament.

Tuft-forming device 300 has positioned thereon, with reference to frame 100, eight individual brush designs 302 and 304 so that eight individual toothbrushes can be simultaneously tufted with fused tufts. The sections 302 and 304 are positioned so that they register on the molded tuft-receiving depressions on the injected mold frame so that alignment takes place so that the pickers will be aligned with the tuft-receiving depressions during tufting.

Figure 12:
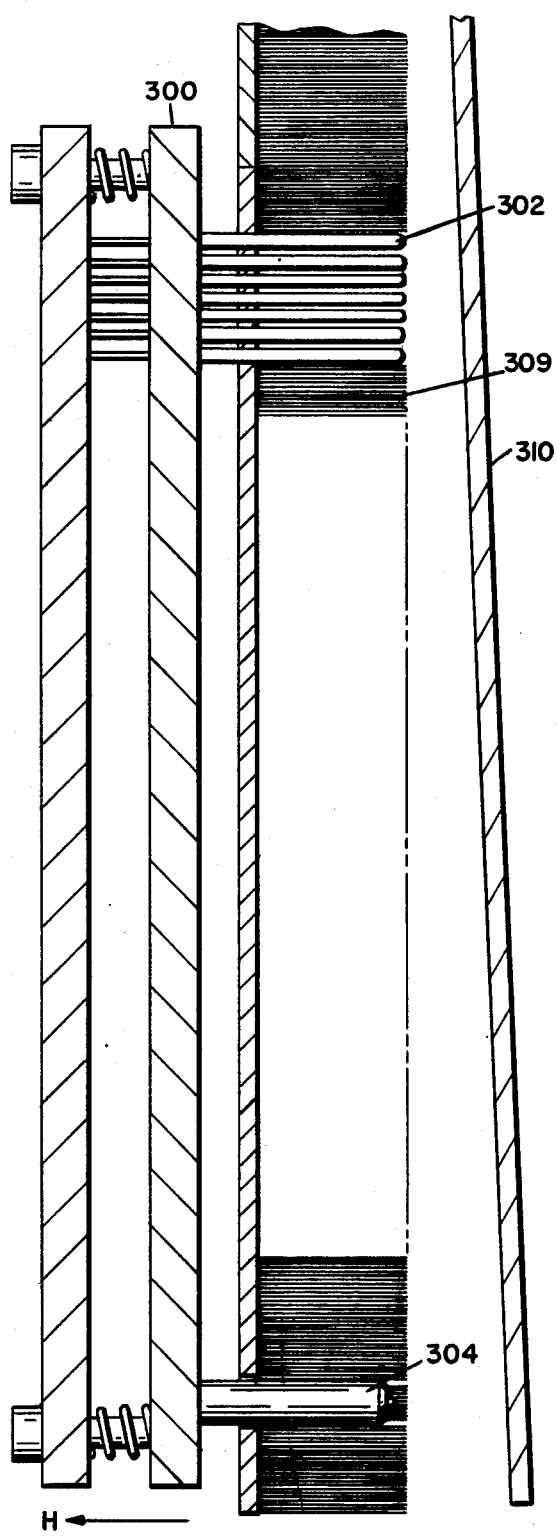
FIG. 12 is a side view in partial section of the tuft-forming picker of FIG. 9 indexed into a filament stock box.
Figure 13:
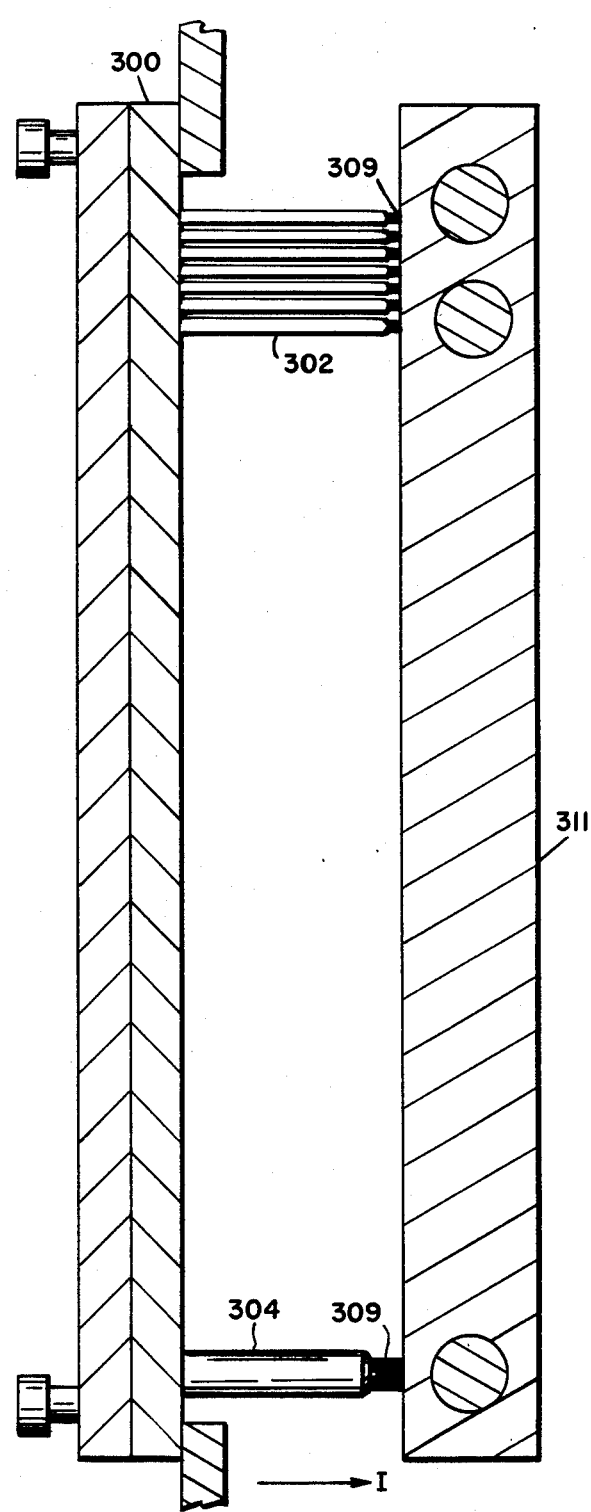
FIG. 13 is a side view in partial section of the tuft-forming picker of FIG. 9 withdrawn from the filament stock box with the picking tube support and trim ends in a closed attitude and filament ends disposed against a melter block for fusing.
Figure 14:
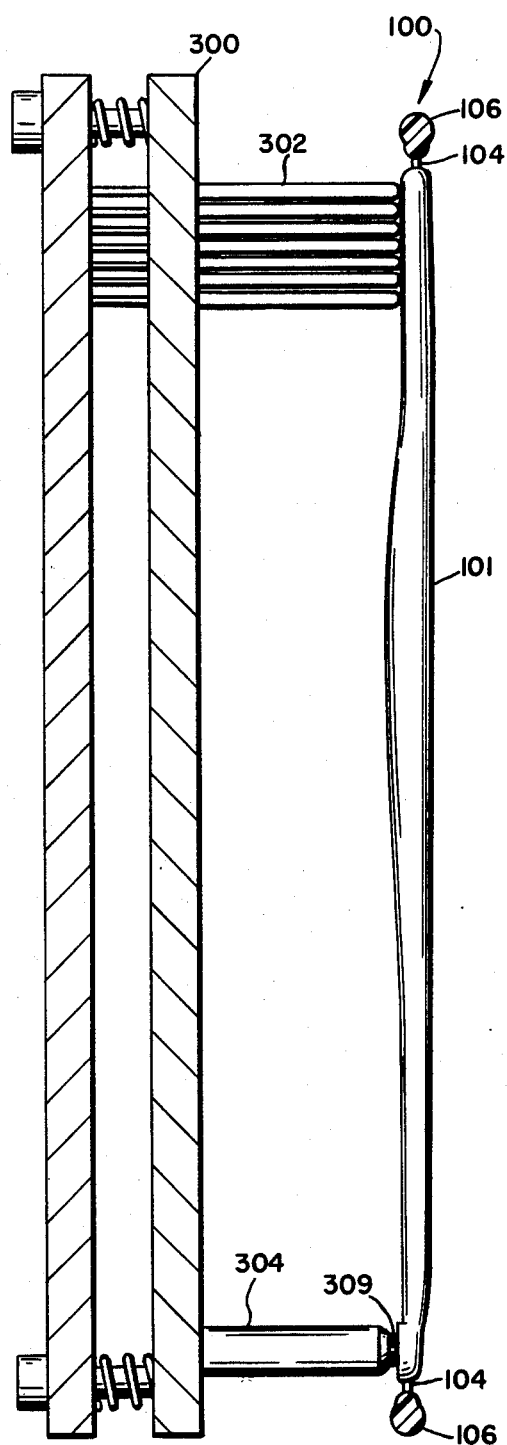
FIG. 14 is a side view in partial section of the tuft-forming picker of FIG. 9 with the fused tuft ends mounted on a framed toothbrush handle.

Picker plate 300 is initially indexed into a filament stock box in the direction F shown in FIG. 11 and simultaneously vibrator plate 310 is moved through direction G—G'. As illustrated in FIG. 12, the pickers 302 and 304 on plate 300 are filled with filament and then withdrawn by withdrawing plate 300 in the direction H. The picker plate 300 can subsequently be indexed into a melter plate 311 in order to fuse the ends of the individual filaments 309 in all picker sections 302 and 304 simultaneously. Upon proper melting of the filament ends 309, the picker plate 300 is indexed into frame 100 containing the toothbrush handles and subsequently pushed into premelted acceptance holes as illustrated in FIG. 14, thus instantly creating eight tufted (fused) toothbrushes 101' as illustrated in FIG. 15.

In summary, the method of the present invention comprises preparing a molded frame having integral a plurality of brush blocks (substrates) together with gates interconnecting the frame and the brush blocks. A runner system whereby the block can be separated from the runner (frame) at the point of attachment is used. Separation is achieved by severing the gate.

The frame is initially inserted into a holding means (not shown). Individual apertures are normally formed in the brush blocks by conventional means for receiving fused tuft ends. A picking attachment is used having the design of the brush blocks in the frame for simultaneously picking tufts of filament. The end of each tuft is then fused simultaneously on a heated plate. The picking attachment then is indexed into the frame-holding means whereby the fused end of each tuft is simultaneously inserted into the brush block tuft-receiving apertures to form simultaneously a plurality of brushes on a single frame. The tuft-picking device is then indexed away from the frame-holding means leaving the tufts mounted on the brush backs whereby simultaneously a plurality of brush constructions will be formed. The frame containing the brushes may then be packaged and marketed, or the individual brushes may be separated from the frame for individual marketing by severing the gates interconnecting the frame with the brush backs.

As will be obvious to those skilled in the art, the method of this invention will dramatically reduce the steps necessary to form a plurality of brushes whereby production may be dramatically increased and labor reduced.

This invention may be practiced by employing thermoplastic molding materials, such as polypropylene, polystyrene, high impact polystyrene, polyurethane, polyamide, and the like. Filaments employed for fused tufts can be obtained from thermoplastic resins, such as polypropylene, polystyrene, polyamide, polyurethane, polyester, and the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for producing, simultaneously, a plurality of integrally connected synthetic fused filament brush constructions comprising:
   providing a thermoplastic injection molded frame in a predetermined configuration, and a plurality of thermoplastic substrate blocks integrally connected within said frame by a plurality of gate members extending between said blocks and frame;
   supporting said frame and integrally connected blocks in a predetermined position;
   providing a plurality of tuft pickers in a preselected design corresponding to the design of tufts to be fused to said substrate blocks, said pickers being arrayed to register a tuft design on each of said blocks in said frame;
   picking a plurality of synthetic fiber tufts with said pickers whereby said tufts are contained within said pickers with the ends exposed;
   simultaneoulsy fusing the ends of each of said tufts and heating the corresponding substrate blocks;
   indexing said fused tuft ends into said substrate blocks until the ends fuse with said blocks whereby said blocks are simultaneously tufted with a plurality of synthetic filament tufts in a preselected array;
   withdrawing said pickers from said tufts to provide a plurality of tufted substrate blocks integrally interconnected with each other by said frame, whereby said frame and resultant tufted blocks become a finished pre-assembly package for distribution.

2. The method of claim 1 wherein said molded frame and integral blocks and tufted brush fibers are of high impact polystyrene.

3. The method of claim 1 wherein said molded frame and integral blocks and tufted brush fibers are of polypropylene.

4. The method of claim 1 wherein said blocks are toothbrush, shaped and said tufted blocks are toothbrushes integrally connected to one another in said frame whereby said frame is a pre-assembled package.

5. The method of claim 1 wherein said blocks are substantially rectangular and said tufted constructions are hand and nail scrub brushes.

6. The method of claim 1 wherein said frame contains at least two different brush blocks.

* * * * *